United States Patent
Meves (10) Patent No.: US 9,450,982 B1
(45) Date of Patent: Sep. 20, 2016

(54) EMAIL SPOOFING DETECTION VIA INFRASTRUCTURE MACHINE LEARNING

(71) Applicant: THE BOEING COMPANY, Chicago, IL (US)

(72) Inventor: Nicholas John Meves, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/744,185

(22) Filed: Jun. 19, 2015

(51) Int. Cl.
*G06F 11/00* (2006.01)
*H04L 29/06* (2006.01)

(52) U.S. Cl.
CPC ....... *H04L 63/1466* (2013.01); *H04L 63/1483* (2013.01); *H04L 63/0876* (2013.01); *H04L 63/145* (2013.01); *H04L 63/1425* (2013.01)

(58) Field of Classification Search
CPC . H04L 63/14; H04L 63/145; H04L 63/1425; H04L 63/1416; H04L 63/08; H04L 63/0876; G06F 21/566
USPC ......................................................... 726/22
See application file for complete search history.

(56) References Cited

U.S. PATENT DOCUMENTS

| | | | | |
|---|---|---|---|---|
| 7,908,328 B1* | 3/2011 | Hulten | ................... | H04L 12/585 709/204 |
| 8,856,239 B1* | 10/2014 | Oliver | ................... | H04L 12/585 709/205 |
| 9,177,293 B1* | 11/2015 | Gagnon | ............... | G06Q 10/107 |
| 2006/0015942 A1* | 1/2006 | Judge | ...................... | H04L 51/12 726/24 |
| 2007/0039038 A1* | 2/2007 | Goodman | ........... | H04L 63/1408 726/2 |
| 2009/0254663 A1* | 10/2009 | Alperovitch | ............ | H04L 45/02 709/227 |
| 2013/0246592 A1* | 9/2013 | Gartside | ............... | H04L 63/145 709/223 |
| 2013/0305357 A1* | 11/2013 | Ayyagari | ................ | H04L 63/14 726/22 |
| 2014/0082726 A1* | 3/2014 | Dreller | ................... | G06Q 10/04 726/23 |
| 2015/0058993 A1* | 2/2015 | Choi | .................... | H04L 63/1433 726/25 |

* cited by examiner

*Primary Examiner* — Samson Lemma
(74) *Attorney, Agent, or Firm* — Marshall, Gerstein & Borun LLP (57) ABSTRACT

A method for detecting a spoofed information packet, includes the steps of building a database from a data value from predetermined designated fields of metadata from a previously and currently received information packet, which includes locating the predetermined designated fields within the previously received information packet metadata; extracting a value from each of the predetermined designated fields; and updating the database with each value with storing each value into at least one data structure of a group of data structures within the database. The method also includes locating predetermined designated fields within metadata of the currently received information packet within data structures, extracting the values from the fields, updating the data base with values extracted and generating a spoofed score for the currently received information packet.

19 Claims, 3 Drawing Sheets

EMAIL SPOOFING DETECTION VIA INFRASTRUCTURE MACHINE LEARNING

FIELD

The present invention relates to a method for reviewing incoming e-mail for predetermined data, more particularly, a method to analyze predetermined metadata to provide an indication whether the e-mail transmission is a spoofed e-mail transmission.

BACKGROUND

There is a need to protect an entity which receives e-mails from hackers. Particularly, from hackers who attempt to gain access to the recipient by gaining the recipient's confidence under false pretenses. Such false pretense can be created by the sender representing the origin of the e-mail as being from a familiar reliable source when in fact the source is not. Using this tactic the sender can gain the confidence and trust of the recipient, such that the recipient, unknowingly clicking on and opening malicious links or on and opening malicious attachments. There is a need to protect the recipients from these hackers which have malicious intent to inflict harm to the recipient.

If a sender properly sets a DomainKeys Identified Mail (DKIM) signature to validate the sender is legitimate this may be helpful in determining a legitimate sender has sent a particular e-mail. However, this is frequently not sent by the sender. Other spoofing detection methods include looking at the quality and content of the e-mail for errors or odd links. However, this method will not detect malicious hackers that do not have errors in their e-mail contents. Additionally, this method involves human judgment and is subject to human error.

There are systems such as Trend Micro®, provided by Trend Micro Incorporated which checks the reputation of the Internet Protocol (IP) address sending the e-mail. If the IP reputation score is bad, the e-mail is blocked. The drawback in this instance is that the system does not detect e-mails spoofed and sent from a legitimate IP address and thereby gets by the IP reputation block.

SUMMARY

An example of a method for detecting a spoofed information packet, includes the steps of building a database from a data value from predetermined designated fields of metadata from a previously and a currently received information packet. The step of building further includes locating the predetermined designated fields within the metadata of the previously received information packet; extracting a value from each of the predetermined designated fields within the metadata of the previously received information packet; and updating the database with each value extracted from the metadata of the previously received information packet with storing each extracted value into at least one of a data structure of a group of data structures within the database. The method further includes locating the predetermined designated fields within the metadata of the currently received information packet and extracting a value from each of the predetermined designated fields of metadata of the currently received information packet. Updating the database with each value extracted from the currently received information packet and storing each extracted value from each of the predetermined designated fields of the currently received information packet into at least one of a data structure of the group of data structures within the database, such that each value extracted from the predetermined designated fields of the currently received information packet will be stored within a data structure of the group of data structures which includes a designation of the predetermined designated field from which the value was extracted. Additionally, the method includes generating a spoofed score for the currently received information packet.

The features, functions, and advantages that have been discussed can be achieved independently in various embodiments or may be combined in yet other embodiments further details of which can be seen with reference to the following description and drawings.

DESCRIPTION

Figure 1:
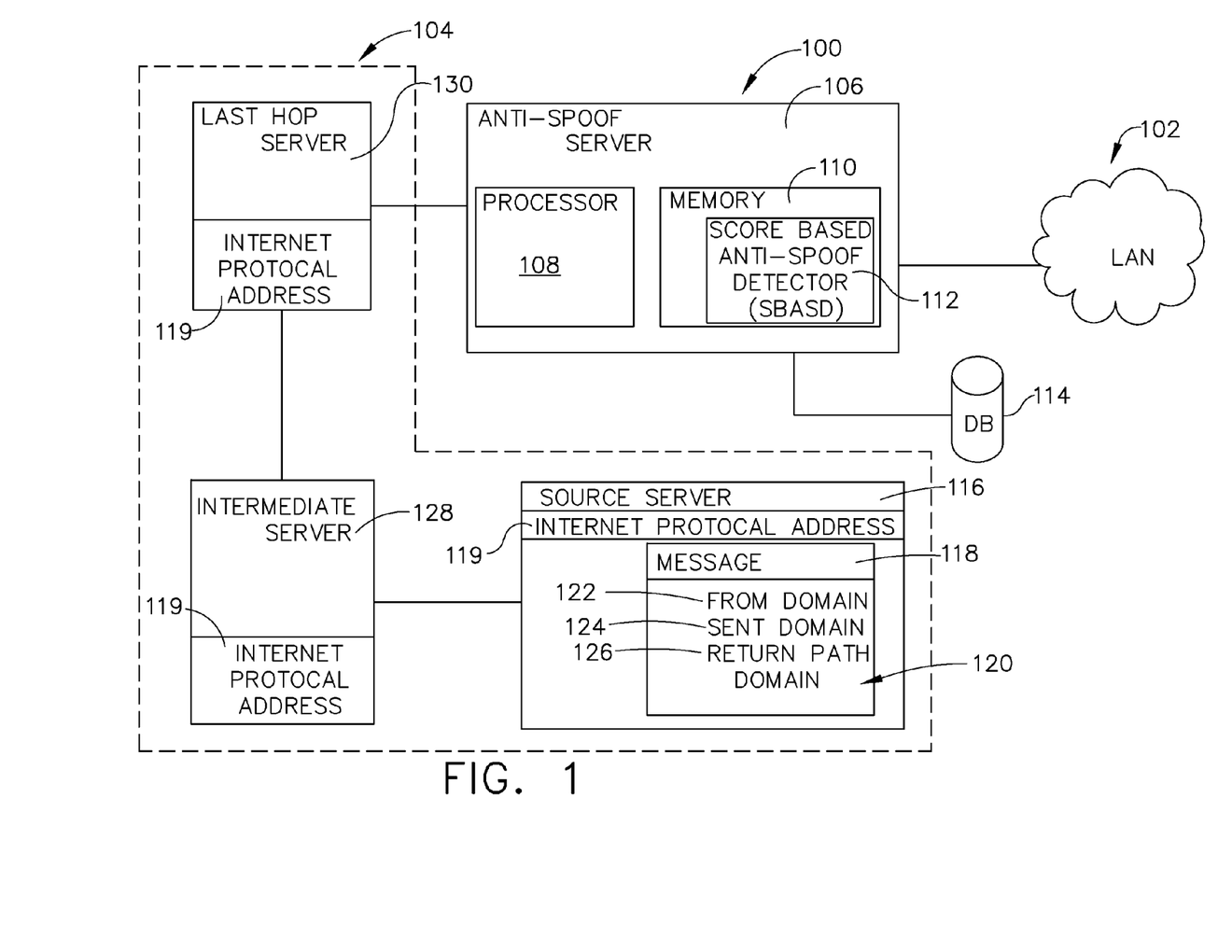
FIG. 1, is a schematic drawing of the anti-spoof system protecting a local area network (LAN)

In Referring to FIG. 1, an example is shown of an anti-spoof server system 100 connected between a LAN 102 and a wide area network (WAN) or worldwide internet system 104. In this disclosure, as information packets or e-mails are received by the anti-spoof server system 100 from WAN 104, certain metadata values from these e-mails will be extracted and accumulated. As e-mails are received by the anti-spoof server system 100, the certain metadata values are extracted from predetermined designated fields and accumulated building a historical database of these certain metadata values. This historical database is constructed from what will be referred to as previously received information packets or e-mails. As a currently received e-mail is received by server system 100, the certain metadata values of the currently received e-mail are also extracted and are added to the historical database. These certain metadata values extracted from the currently received e-mail are also analyzed with respect the certain metadata that has been historically accumulated. This analysis will result in issuing a spoofed score for the currently or newly received e-mail, providing a recipient of the currently received e-mail an indication of the likelihood of whether the currently received e-mail is spoofed.

LAN 102 can be any local network, for example, such as a network operating for a business entity or corporation. The anti-spoof server system 100 includes server 106 or a plurality of servers. In this example, server 106 includes one or more processors 108 connected to a memory 110 which may include a plurality of memories. Memory 110 carries instructions which are carried out on processor 108. Memory 110 includes a score based anti-spoof detector 112 which includes software instructions, which provide instructions in which to operate processor 108.

Processor 108 will carry out instructions for building the historical database of the certain values extracted from the predetermined designated fields of the metadata of the previously received e-mails and the currently received e-mail, which have been received by server 106. The instructions will include storing those certain values in a database within memory 110, or as in this example, database device 114. Processor 108 will carry out additional instructions from the score based anti-spoof detector 112 within memory 110 of analyzing the extracted certain data values of the currently received e-mail with respect to the historical database of the certain values extracted from the previous e-mails and the currently received e-mail, which were received by server 106 from the WAN or worldwide internet network 104. The analysis will provide a spoofed score for the newly received e-mail, which provides the recipient an indication of whether the newly received e-mail is spoofed.

E-mails received by server 106 were originated from a source server 116 related to the user who created the e-mail communication. The e-mail communication carries a substantive message 118 for the recipient to read and carries metadata 120 which includes a wide variety of information related to the e-mail including, among a wide variety of data, a from domain value 122, a sender domain value 124 and a return-path domain value 126. In addition, the metadata includes Internet Protocol address values 119. As message 118 passes through a device within WAN 104, the metadata associated with message 118 acquires an Internet Protocol address value 119 for the device through which message 118 traveled. The Internet Protocol address values 119 are different from one another for each particular device, identifying that device. As message 118 travels through source server 116, through intermediate server 128 and through last hop server 130, metadata 120 of message 118 adds an Internet Protocol address value for each of these server devices. Intermediate server 128 could include, in some communications of e-mails, a number of servers within WAN 104 and therefore a number of address values which correspond to each of these servers will be placed within the metadata of message 118. Last hop server 130 is the last server message 118 was transmitted from prior to being received by server 106. Server 106, in this example, is the server receiving message 118 prior to the e-mail message being transmitted into LAN 102.

Figure 2:
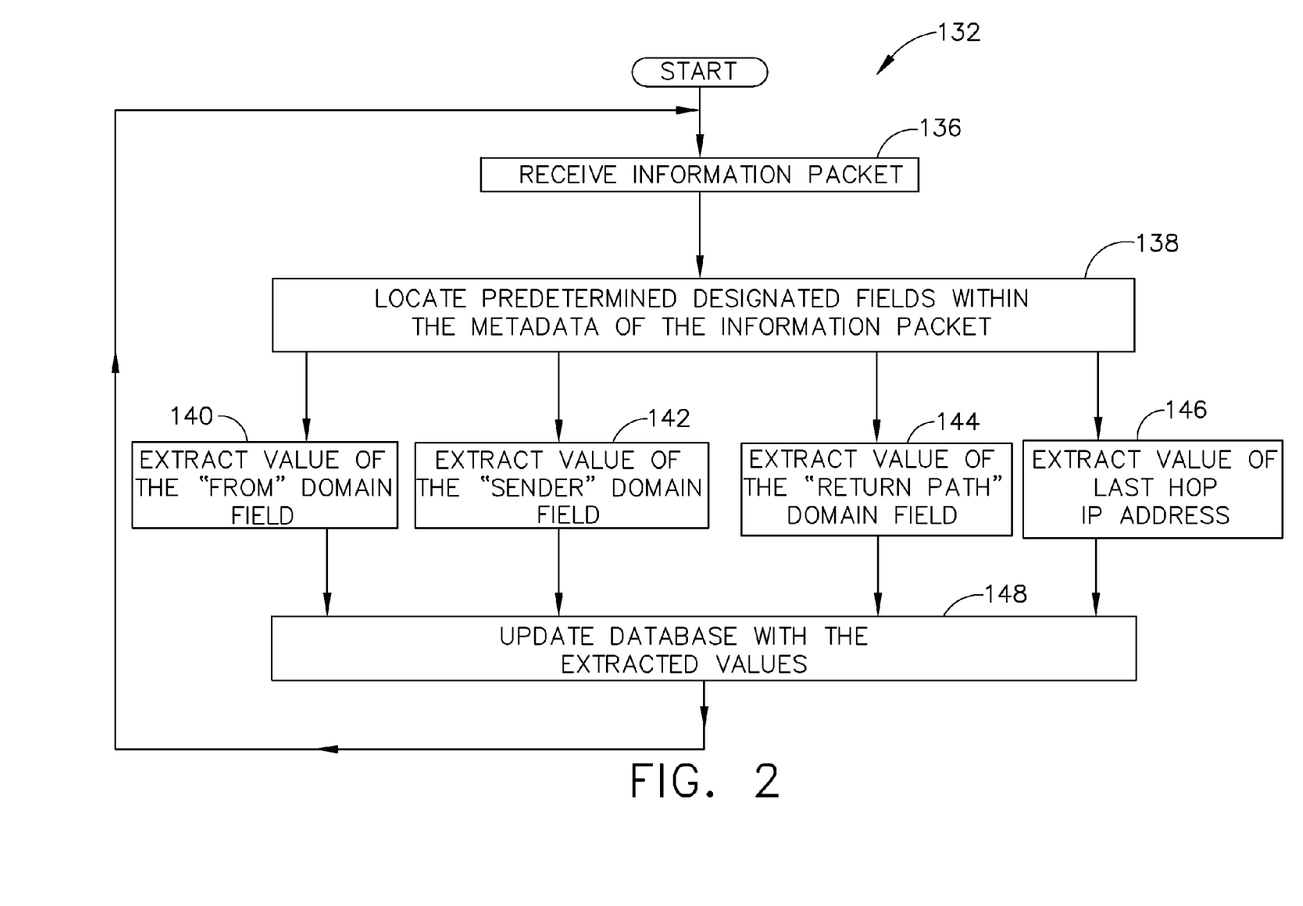
FIG. 2, is a flow chart for a method of updating a database with predetermined values extracted from a received information packet.

In referring to FIG. 2, a flow chart 132 is shown, setting forth a method of updating a database within, in this example, database device 114 with the certain values from predetermined designated fields from within the metadata of a received information packet or e-mail. Updating database 114 with these certain values from these predetermined designated fields, updates the database within database device 114 with these values being extracted from the previously received and currently received e-mails. This updating constructs the historical database, which will be used in the analysis of the certain values extracted from the metadata of the currently received e-mail to generate a spoofed score for the currently received e-mail and generate an indication of whether the currently received e-mail is spoofed.

The information packet or e-mail in step 136 is received from WAN 104 by server 106. Processor 108 of server 106 is instructed to locate predetermined designated fields of data within the metadata of the previously received and currently received information packets or e-mails in step 138. In this example, a value from each of the predetermined designated fields of the metadata of the previously and currently received e-mails are extracted. This extracting would include extracting the values of a from domain value, a sender domain value and a return-path domain value from their respective from, sender and return-path predetermined designated fields of the metadata of the previously received and the currently received e-mails. The steps to extract these values are set forth in steps 140, 142 and 144, respectively. Additionally, an Internet Protocol address value is extracted from the predetermined designated field of the Internet Protocol address of the previously and currently received e-mails, in step 148. In this example, the Internet Protocol address value extracted is a last hop 130 Internet Protocol address value 119, in step 146. The last hop internet Protocol address is the last server device 130 from which an e-mail has been transmitted to server 106.

Step 148 includes the step to update the database within database device 114 with the extracted values, in this example, the from domain value, the sender domain value, the return-path domain value and the Internet Protocol address value, that have been extracted from the previously received e-mails. More details of the updating process will be provided below. With the updating step 148 completed and another information packet or e-mail is received, that currently received information packet is received at step 136 and proceeds through method 132, as described above.

Step 148 includes the step of storing each extracted value from the metadata of the previously received information packet or e-mail into at least one of a data structure of a group of data structures within the database. Each data structure includes a corresponding relationship between two different designated predetermined fields which correspond to two different designated predetermined fields within the metadata. The predetermined designated fields of the metadata are fully represented within the group of the data structures within the database stored within database device 114, such that each value extracted from the predetermined designated fields of the previously received information packet or e-mail will be stored within a data structure, which comprises a designation of the predetermined designated field from which the value was extracted. The updating of the database with the extracted values of a currently received e-mail in step 148 is carried out similarly to the updating of the database with the extracted values of the previously received e-mails as set forth above. The extracted values of the predetermined designated fields of the metadata of the currently received e-mail are updated into the database with storing each extracted value from each of the predetermined designated fields of the currently received information packet into at least one of a data structure of the group of data structures within the database. The data is stored such that each value extracted from the predetermined designated fields of the currently received information packet will be stored within a data structure of the group of data structures, which includes a designation of the predetermined designated field from which the value was extracted.

The group of data structures within the database include a first data structure which includes a from domain predetermined designated field designation value corresponding to an Internet Protocol address predetermined designated field designation value. The group of data structures includes a second data structure including a sender domain predetermined designated field designation value corresponding to the Internet Protocol address predetermined designated field designation value. The group of data structures further include a third data structure including a return-path domain predetermined designated field designation value corresponding to the Internet Protocol address predetermined designated field designation value. Included in the group of data structures is a fourth data structure including the from domain predetermined designated field designation value corresponding to the return-path domain predetermined designated field designation value. Also, included in the group data structures, in this example, is a fifth data structure comprising the sender domain predetermined designated field designation value corresponding to the return-path domain predetermined designated field designation value.

The step 148 of updating the database with extracted values from each of the predetermined designated fields of the metadata of the previously received information packet or e-mail, includes the step of storing a from domain value, a sender domain value and a return-path domain value, extracted from the previously received information packet such that, the from domain value is stored in the from domain predetermined designated field designation value of first data structure, the sender domain value is stored in the sender domain predetermined designated field designation value of the second data structure, and the return-path domain value is stored within the return-path domain value predetermined designated field designation value of the third data structure, respectively. The extracted value, from the previously received information packet or e-mail, of an Internet Protocol address value is stored in each of the first, second and third data structures in the Internet Protocol address predetermined designated field designation value, respectively, in correspondence with each of the stored from domain, sender domain and return-path domain values. Step 148 also includes storing the from domain value in the fourth data structure in the from domain predetermined designated field designation value and the sender domain value in the fifth data structure in the sender domain predetermined designated field designation value. This includes the storing of the return-path domain value in the fourth and fifth data structures in the return-path domain predetermined designated field designation values of the fourth and fifth data structures, corresponding to the stored from and sender domain values, respectively.

Step 148 of updating the database with extracted values from each extracted value from each of the predetermined designated fields the metadata of the currently received information packet or e-mail, includes the step of storing a from domain value, a sender domain value and a return-path domain value in the from domain predetermined designated field designation value of first data structure, in the sender domain predetermined designated field designation value, and in the return-path domain predetermined designated field designation value of the third data structure, respectively, and an extracted value of an Internet Protocol address value is stored in each of the first, second and third data structures in the Internet Protocol address predetermined designated field designation value in correspondence with each of the stored from domain, sender domain and return-path domain values, respectively. The step of storing further includes storing the from domain value in the fourth data structure in the from domain predetermined designated field designation value and the sender domain value in the fifth data structure in the sender domain predetermined designated field designation value, and the return-path domain value in the fourth and fifth data structures in the return-path domain predetermined designated field value of the fourth and fifth data structures corresponding to the stored from and sender domain values.

As has been discussed above, a historical database containing the above described configured data structures has been constructed from the metadata from previously and currently received e-mails. In referring to FIG. 3, a flow chart 150 is shown for a method of generating a spoof score and indicating spoof probability for a recently received information packet. In step 152 an information packet or e-mail which has been currently received in processor 108, wherein the from domain, sender domain, return-path domain and Internet Protocol address values have been extracted is steps 142, 144 and 146 in FIG. 2 and have been updated and stored in their respective data structures as discussed above in step 148. Processor 108 is instructed to identify the values of the extracted values of the predetermined designated fields of the metadata of the currently received information packet, in step 154. The processor 108 is further instructed to instruct database device 114 to locate the data structures within the database that have correspond to the values that have been extracted from the information packet in step 156.

Figure 3:
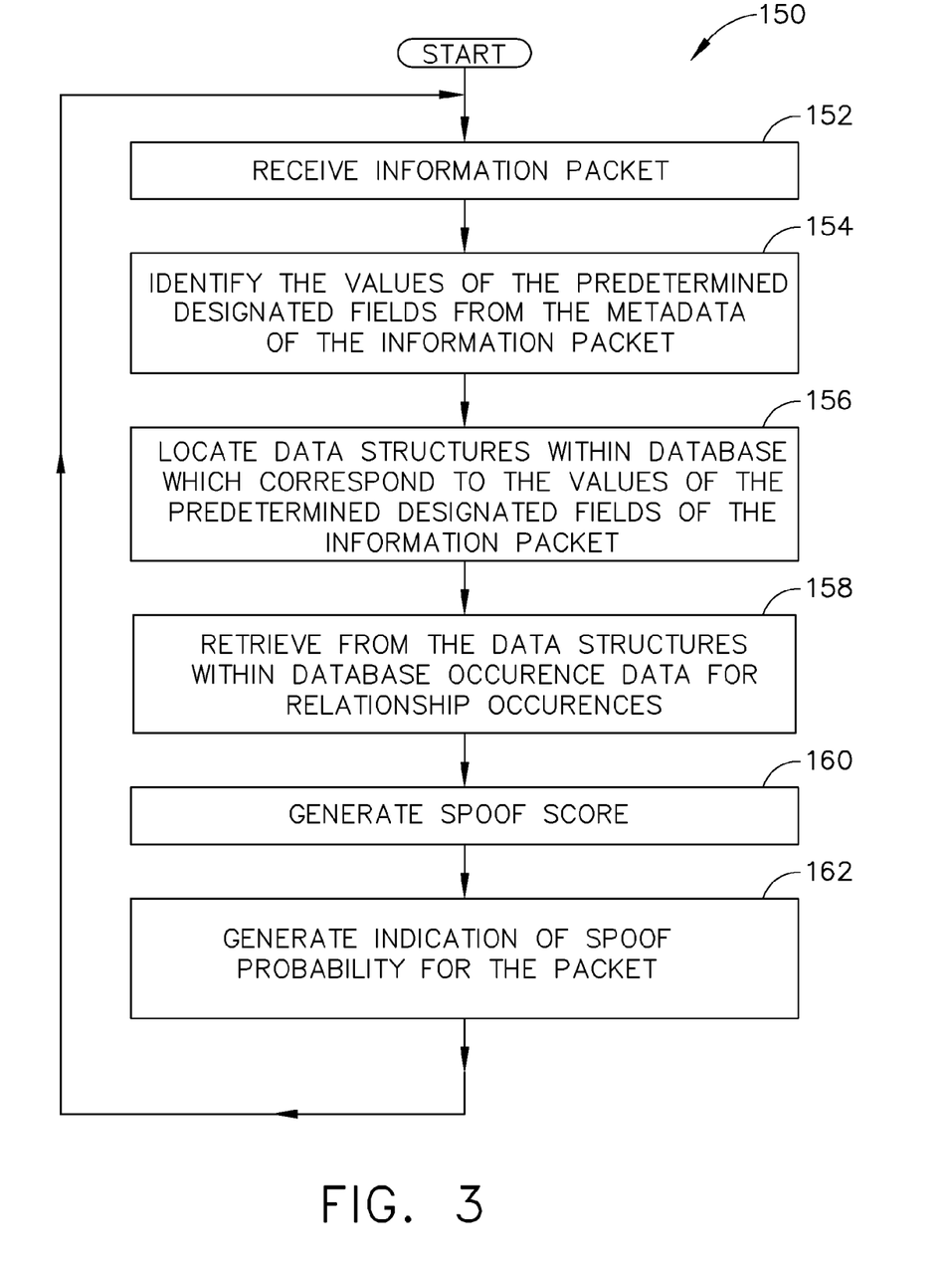
FIG. 3 is a flow chart for a method of generating a spoof score and indicating spoof probability for a recently received information packet.

In step 156, the from domain value, the sender domain value, the return-path domain value and the Internet Protocol address value have been identified for the currently received information packet and are applied in step 156 to locate the appropriate data structures that correspond to these extracted values. In locating the data structures, in this example, the from domain value, which has been identified, is located within the first data structure with Internet Protocol address values that correspond to the identified from domain value. Similarly, this is done in step 156 for the identified sender domain value, wherein the identified sender domain value is located within the second data structure with Internet Protocol address values that correspond to the identified sender domain value. This is the case for the identified return-path value, wherein the identified return-path domain value is located within the third data structure with Internet Protocol address values that correspond to the identified return-path domain value. Additionally, the identified from domain value is located within the fourth data structure with return-path domain values that correspond to the identified from domain value. Also, the identified sender domain value is located within the fifth data structure with return-path domain values that correspond to the identified sender domain value.

In the process of building the historical database, a count is maintained of the occurrence of the appearance of certain values within each of the data structures. This will be described in more detail below. The counts will relate to appearances of Internet Protocol address values and return-path domain values. In this embodiment, there will be three different counts maintained within the data structures. These counts will include a score count, a highest count and a total count.

Maintaining a score count includes maintaining a count number occurrence of the appearing of a same Internet Protocol address value which corresponds to a from domain value within the first data structure. Thus, for example, for a from domain value which has a certain g-mail domain value, counts will be maintained of Internet Protocol address values which have the same value, appear in the first data structure and correspond to the same from domain g-mail value.

Maintaining a score count also includes maintaining a count number occurrence of the appearing of a same Internet Protocol address value which corresponds to a sender domain value within the second data structure. Thus, for example, for a sender domain which has a certain g-mail domain value, counts will be maintained of Internet Protocol address values which have the same value, appear in the second data structure and correspond to the same sender domain g-mail value.

Maintaining a score count also includes maintaining a count number occurrence of the appearing of a same Internet Protocol address value which corresponds to a return-path domain value within the third data structure. Thus, for example, for a return-path domain value which has a certain g-mail domain value, counts will be maintained of Internet Protocol address values which have the same value, appear in the third data structure and correspond to the same return-path domain g-mail value.

Maintaining a score count also includes maintaining a count number occurrence of the appearing of a same return-path domain value which corresponds to a from domain value within the fourth data structure. Thus, for a from domain value such as a certain g-mail domain value, counts will be maintained of return-path domain values which have the same value, appear in the fourth data structure and correspond to the same from domain g-mail value.

Maintaining a score count also includes maintaining a count number occurrence of appearing of a same return-path domain value which corresponds to a sender domain value within the fifth data structure. Thus, for a sender domain value such as a certain g-mail domain value, counts will be maintained of return-path domain values which have the same value, appear in the fifth data structure and correspond to the same sender domain g-mail value.

Maintaining a highest count includes maintaining a highest count number occurrence of the appearing of the same Internet Protocol address value which corresponds to a from domain value within the first data structure.

Maintaining a highest count also includes maintaining a highest count number occurrence of the appearing of the same Internet Protocol address value which corresponds to a sender domain value within the second data structure.

Maintaining a highest count also includes maintaining a highest count number occurrence of the appearing of the same Internet Protocol address value which corresponds to a return-path domain value within the third data structure.

Maintaining a highest count also includes maintaining a highest count occurrence of the appearing of the same return-path domain value which corresponds to a from domain value within the fourth data structure.

Maintaining a highest count also includes maintaining a highest count number occurrence of the appearing of the same return-path value which corresponds to the same sender path domain value within the fifth data structure.

Maintaining a total count also includes maintaining a total count occurrence of the appearing of all the Internet Protocol address values which correspond to a from domain value within the first data structure.

Maintaining a total count also includes maintaining a total count occurrence of the appearing of all the Internet Protocol address values which correspond to a sender domain value within the second data structure.

Maintaining a total count also includes maintaining a total count occurrence of the appearing of all the Internet Protocol address values which correspond to a return-path domain value within the third data structure.

Maintaining a total count also includes maintaining a total count occurrence of the appearing of all the return-path domain values which correspond to a from domain value within the fourth data structure.

Maintaining a total count also includes maintaining a total count occurrence of the appearing of all the return-path domain values which correspond to a sender path domain value within the fifth data structure.

With the arrival of a currently received e-mail and the extracted values from the metadata have been updated and stored within the database, step 156 is carried out to locate data structures within the database which correspond to the values of that have been identified from the currently received information packet or e-mail. These values that have been identified from the currently received e-mail include the from domain value, sender domain value, return-path domain value and the Internet Protocol address value. These identified values are used in locating the same values within each of the first through fifth data structures.

Thus, with having located the first data structure which has the identified from domain value and the corresponding identified Internet Protocol address value associated with the identified from domain value, both values are from the currently received e-mail, step 158 is initiated to carry out retrieving from the database occurrence data for relationship occurrences of the data structures. In this instance, with respect to the first data structure and the identified from domain value of the currently received e-mail, the score count for the identified Internet Protocol value of the currently received e-mail, which corresponds to the identified from domain value of the currently received e-mail is retrieved. The highest count for an Internet Protocol value which corresponds to the identified from domain value of the currently retrieved e-mail is also retrieved. Also, the total count of all Internet Protocol values which correspond to the identified from domain value of the currently retrieved e-mail is retrieved from the first data structure.

Having located the second data structure with the identified sender domain value and the identified Internet Protocol address value of the currently received e-mail, the score count for the identified Internet Protocol value of the currently received e-mail, which corresponds to the identified sender domain value of the currently received e-mail is retrieved. The highest count for an Internet Protocol value which corresponds to the identified sender domain value of the currently retrieved e-mail is also retrieved. Also, the total count of Internet Protocol values which correspond to the identified sender domain value of the currently retrieved e-mail is retrieved from the second data structure.

Having located the third data structure with the identified sender domain value and the identified Internet Protocol address value of the currently received e-mail, the score count for the identified Internet Protocol value of the currently received e-mail, which corresponds to the identified return-path domain value of the currently received e-mail is retrieved. The highest count for an Internet Protocol value which corresponds to the identified return-path domain value of the currently retrieved e-mail is also retrieved. Also, the total count of Internet Protocol values which correspond to the identified return-value domain value of the currently retrieved e-mail is retrieved from the third data structure.

Having located the fourth data structure with the identified from domain value and the identified return-path domain value of the currently received e-mail, the score count for the return-path domain value of the currently received e-mail, which corresponds to the identified from domain value of the currently received e-mail is retrieved. The highest count for a return-path domain value which corresponds to the identified from domain value of the currently retrieved e-mail is also retrieved. Also, the total count of return-path values which correspond to the identified from domain value of the currently retrieved e-mail is retrieved from the fourth data structure.

Having located the fifth data structure with the identified sender domain value and the identified return-path domain value of the currently received e-mail, the score count for the return-path domain value of the currently received e-mail, which corresponds to the identified sender domain value of the currently received e-mail is retrieved. The highest count for a return-path domain value which corresponds to the identified sender domain value of the currently retrieved e-mail is also retrieved. Also, the total count of return-path values which correspond to the identified sender domain value of the currently retrieved e-mail is retrieved from the fifth data structure.

Once the score, highest and total counts have been retrieved from the first through fifth data structures based on the identified values of from domain, sender domain, return-path domain and Internet Protocol address for the currently received e-mail, step 160 can be commenced for generating a spoof score for the recently received e-mail. Step 160 for generating a spoof score begins, in this example, with calculating a threshold value for each of the first, second, third, fourth and fifth data structures for the currently received information packet or e-mail.

Calculating the threshold value for the first data structure includes applying the highest and total counts for the first data structure for the recently received e-mail to: the highest count times (the highest count/the total count) times 0.05. Calculating the threshold value for the second data structure includes applying the highest and total counts for the second data structure for the recently received e-mail to: the highest count times (the highest count/the total count) times 0.05. Calculating the threshold value for the third data structure includes applying the highest and total counts for the third data structure for the recently received e-mail to: the highest count times (the highest count/the total count) times 0.05. Calculating the threshold value for the fourth data structure includes applying the highest and total counts for the fourth data structure for the recently received e-mail to: the highest count times (the highest count/the total count) times 0.01. Calculating the threshold value for the fifth data structure includes applying the highest and total counts for the fifth data structure for the recently received e-mail to: the highest count times (the highest count/the total count) times 0.01.

Step 160 for generating a spoof score for a recently received e-mail includes the step of assigning a predetermined numerical value to each of the first through fifth data structures based on the score count for the data structure in relationship to the threshold value calculated for that particular data structure.

The assigning a predetermined numerical value for the first data structure, includes assigning a predetermined numerical value to the first data structure, having a value which indicates the currently received information packet is scoring in a direction indicating the currently received information packet is spoofed, if the score count for the identified Internet Protocol address value of the currently received information packet has been received for the first time corresponding to the identified from domain value, of the currently received information packet, within the first data structure. In the present example, the lower the numerical value the lower the probability of the currently received e-mail is spoofed. Thus, for this example, the first data structure will be assigned the predetermined numerical value or score of a maximum of six (6).

The assigning a predetermined numerical value for the second data structure, includes assigning a predetermined numerical value to the second data structure, having a value which indicates the currently received information packet is scoring in a direction indicating the currently received information packet is spoofed, if the score count for the identified Internet Protocol address value of the currently received information packet has been received for the first time corresponding to the identified sender domain value, of the currently received information packet, within the second data structure. In the present example, the lower the numerical value the lower the probability of the currently received e-mail is spoofed. Thus, for this example, the second data structure will be assigned the predetermined numerical value or score of a maximum of six (6).

The assigning a predetermined numerical value for the third data structure, includes assigning a predetermined numerical value to the third data structure, having a value which indicates the currently received information packet is scoring in a direction indicating the currently received information packet is spoofed, if the score count for the identified Internet Protocol address value of the currently received information packet has been received for the first time corresponding to the identified return-path domain value, of the currently received information packet, within the third data structure. In the present example, the lower the numerical value the lower the probability of the currently received e-mail is spoofed. Thus, for this example, the third data structure will be assigned the predetermined numerical value or score of a maximum of twelve (12).

The assigning a predetermined numerical value for the fourth data structure, includes assigning a predetermined numerical value to the fourth data structure, having a value which indicates the currently received information packet is scoring in a direction indicating the currently received information packet is spoofed, if the score count for the identified return-path domain value of the currently received information packet has been received for the first time corresponding to the identified from domain value, of the currently received information packet, within the fourth data structure. In the present example, the lower the numerical value the lower the probability of the currently received e-mail is spoofed. Thus, for this example, the fourth data structure will be assigned the predetermined numerical value or score of a maximum of two (2).

The assigning a predetermined numerical value for the fifth data structure, includes assigning a predetermined numerical value to the fifth data structure, having a value which indicates the currently received information packet is scoring in a direction indicating the currently received information packet is spoofed, if the score count for the identified return-path domain value of the currently received information packet has been received for the first time corresponding to the identified sender domain value, of the currently received information packet, within the fifth data structure. In the present example, the lower the numerical value the lower the probability of the currently received e-mail is spoofed. Thus, for this example, the fifth data structure will be assigned the predetermined numerical value or score of a maximum of two (2).

Assigning another or different predetermined numerical value to the first through fifth data structures, for a currently received e-mail, takes place when the score count of the particular data structure is greater than the threshold value for that particular data structure.

The assigning of the other predetermined numerical value to the first data structure, having a numerical value, which indicates the currently received information packet is scoring in a direction away from indicating the currently received information packet is spoofed, with the identified Internet Protocol address value, of the currently received information packet, having a score count greater than the threshold value for the first data structure. In the present example, the lower the numerical value the lower the probability of the currently received e-mail is spoofed. Thus, for this example, the first data structure will be assigned the other predetermined numerical value or score of a minimum of zero (0).

The assigning of the other predetermined numerical value to the second data structure, having a numerical value, which indicates the currently received information packet is scoring in a direction away from indicating the currently received information packet is spoofed, with the identified Internet Protocol address value, of the currently received information packet, having a score count greater than the threshold value for the second data structure. In the present example, the lower the numerical value the lower the probability of the currently received e-mail is spoofed. Thus, for this example, the second data structure will be assigned the other predetermined numerical value of a minimum of zero (0).

The assigning of the other predetermined numerical value to the third data structure, having a numerical value, which indicates the currently received information packet is scoring in a direction away from indicating the currently received information packet is spoofed, with the identified Internet Protocol address value, of the currently received information packet, having a score count greater than the threshold value for the third data structure. In the present example, the lower the numerical value the lower the probability of the currently received e-mail is spoofed. Thus, for this example, the third data structure will be assigned the other predetermined numerical value of a minimum of zero (0).

The assigning of the other predetermined numerical value to the fourth data structure, having a numerical value, which indicates the currently received information packet is scoring in a direction away from indicating the currently received information packet is spoofed, with the identified return-path domain value, of the currently received information packet, having a score count greater than the threshold value for the fourth data structure. In the present example, the lower the numerical value the lower the probability of the currently received e-mail is spoofed. Thus, for this example, the fourth data structure will be assigned the other predetermined numerical value of a minimum of zero (0).

The assigning of the other predetermined numerical value to the fifth data structure, having a numerical value, which indicates the currently received information packet is scoring in a direction away from indicating the currently received information packet is spoofed, with the identified return-path domain value, of the currently received information packet, having a score count greater than the threshold value for the fifth data structure. In the present example, the lower the numerical value the lower the probability of the currently received e-mail is spoofed. Thus, for this example, the fifth data structure will be assigned the other predetermined numerical value of a minimum of zero (0).

In step 160 to generate a spoof score for a currently received e-mail, if the determined numerical value or other determined numerical value is not applicable based on the score count for a particular data structure, further value calculations will be applied to the data structure to obtain a weighted numerical value for that data structure, as will be discussed below. This will occur with the score count is less than the threshold value for that data structure and is greater than if the score count represented a first time occurrence in appearing is that data structure.

In furtherance of step 160 a first, second and third weighted numerical values are generated. In deriving a first weighted numerical value, which is based on the third data structure, the first weighted numerical value is established with assigning one of the predetermined numerical value of the third data structure or the other predetermined numerical value of the third data structure to the first weighted numerical value or calculating the first weighted numerical value with the application of the score count for the Internet Protocol address value of the third data structure and the threshold value of the third data structure, obtained from the currently received information packet. With respect to the present example, in calculating a first weighted numerical value for the third data structure, if the score count is less than the threshold value times (0.20) for the third data structure, the first weighted numerical value or score for the third data structure is calculated as equal to eight (8−(8 times (score count/(threshold value times (0.20))) and that value is added to a value of (2−(2 times (score count/threshold value))). If the score count is greater than the threshold value times (0.20) but still less than the threshold for the third data structure, then the first weighted numerical value for the third data structure will be (2−(2 times (the score count of the third data structure/the threshold value of the third data structure))).

In deriving a second weighted numerical, the second weighted numerical value is obtained from a summation of a first sub-total value based on the first data structure and a second sub-total value based on the second data structure. In deriving the first sub-total value, this is accomplished with assigning one of the predetermined numerical value of the first data structure or the other predetermined numerical value of the first data structure to the first sub-total value, or calculating the first sub-total value with the application of the score count for the Internet Protocol address value of the first data structure and the threshold value of the first data structure, obtained from the currently received information packet. With respect to the present example, in calculating the first sub-total for the second weighted numerical value, if the score count is less than the threshold value times (0.20) for the first data structure, the score or value for the first data structure is equal to (4−(4 times (score count/(threshold value times (0.20))) and that value is added to a value of 1−(score count/threshold value). If the score count is greater than the threshold value times (0.20) but still less than the threshold for the first data structure, then the first sub-total of the second weighted numerical value will be (1−(1 times the score value of the first data structure/the threshold value of the first data structure)).

In deriving the second sub-total value, this is accomplished with assigning one of the predetermined numerical value of the second data structure or the other predetermined numerical value of the second data structure to the first weighted numerical value, or calculating the first weighted numerical value with the application of the score count for the Internet Protocol address value of the second data structure and the threshold value of the second data structure, obtained from the currently received information packet. With respect to the present example, in calculating the second sub-total of the second weighted numerical value, if the score count is less than the threshold value times (0.20) for the second data structure, the score or value for the second data structure is provided a value equal to (4−(4 times (score count/(threshold value times (0.20))) and that value is added to a value of 1−(score count/threshold value). If the score count is greater than the threshold value times (0.20) but still less than the threshold for the second data structure, then the second sub-total of the second weighted numerical value will be (1−(1 times the score value of the second data structure/the threshold value of the second data structure)).

With both values for the from domain and the sender domain present within the predetermined designated fields for the currently received information packet, the first sub-total value of the second weighted numerical value and the second sub-total value of the second weighted numerical value are weighted, such that the first sub-total value is multiplied by twenty-five percent and the second sub-total is multiplied by seventy-five percent before summing the first and second sub-totals together to obtain the second weighted numerical value. Otherwise, should a value for the sender domain not be present in the predetermined designated fields of the currently received information packet, the first sub-total becomes the second weighted numerical value.

In deriving a third weighted numerical value, the third weighted numerical value is obtained from a summation of a first sub-total value based on the fourth data structure and a second sub-total value based on the fifth data structure. In deriving the first sub-total, this is accomplished with assigning one of the predetermined numerical value of the fourth data structure or the other predetermined numerical value of the fourth data structure to the first sub-total value, or calculating the first sub-total value with the application of the score count for the Internet Protocol address value of the fourth data structure and the threshold value of the fourth data structure, obtained from the currently received information packet. With respect to the present example, calculating the first sub-total of this third weighted numerical value or score if the score count is less than the threshold value times (0.20) for the fourth data structure, the score or value for the fourth data structure is equal to (1−(1 times (score count/(threshold value times (0.20))) and that value is added to a value of (0.50−(0.50 times (score count/threshold value))). If the score count is greater than the threshold value times (0.20) but still less than the threshold for the fourth data structure, then the first sub-total of the third weighted numerical value will be (0.50−(0.50 times (the score value of the fourth data structure/the threshold value of the fourth data structure))).

In deriving the second sub-total value, this is accomplished with assigning one of the predetermined numerical value of the fifth data structure or the other predetermined numerical value of the fifth data structure to the first weighted numerical value, or calculating the third weighted numerical value with the application of the score count for the Internet Protocol address value of the fifth data structure and the threshold value of the fifth data structure, obtained from the currently received information packet. With respect to the present example, calculating the second sub-total of this third weighted numerical value or score, if the score count is less than the threshold value times (0.20) for the fifth data structure, the score or value for the fifth data structure is equal to (1)−(1 times (score count/(threshold value times (0.20))) and that value is added to a value of (0.50−(0.50 times (score count/threshold value))). If the score count is greater than the threshold value times (0.20) but still less than the threshold for the fifth data structure, then the second sub-total of the third weighted numerical value will be (0.50−(0.50 times (the score value of the fifth data structure/the threshold value of the fifth data structure))).

With both values for the from domain and the sender domain present within the predetermined designated fields for the currently received information packet, the first sub-total value of the third weighted numerical value and the second sub-total value of the third weighted numerical value are weighted, such that the first sub-total value is multiplied by twenty-five percent and the second sub-total is multiplied by seventy-five percent before summing the first and second sub-totals together to obtain the third weighted numerical value, otherwise, should a value for the sender domain not be present in the predetermined designated fields of the currently received information packet, the first sub-total becomes the third weighted numerical value.

Step 160 for generating a spoofed score for the currently received information packet, further includes the first weighted numerical value, as discussed above, has two times greater importance than the second weighted numerical value in calculating or generating the spoof score for a currently received e-mail. This can be seen, in this example, wherein the maximum predetermined numerical value or score which is assignable to the first weighted score is twelve (12). This value is assigned should the identified Internet Protocol value for the currently received information packet be a first time appearance in the third data structure corresponding to the identified return-path domain value for the currently received information packet. In contrast, the maximum predetermined numerical value or score is six (6) with respect to the second weighted value or score in adding the first and second sub-totals of the first and second data structures. A first time appearance occurrence with the identified Internet Protocol address value corresponding to the identified from domain of the currently received information packet in the first data structure, would result in the assigning of a value of six (6) to first sub-total of the second weighted value. Similarly, a first time appearance occurrence with the identified Internet Protocol address value corresponding to the identified sender domain of the currently received information packet in the second data structure would result in the assigning of a value of six (6) to second sub-total of the second weighted value. In the instance, for example, both the first and second data structures obtain the maximum value of six (6), the first sub-total will be provided a twenty five percent weighting of the value of six (6) and the second sub-total will be provided a seventy five percent weighting of the value of six (6). This would result in a second weighted value total of six (6).

The first weighted numerical value has a six times greater importance than the third weighted numerical value. As described above the first weighted numerical value has a maximum predetermined numerical score of twelve (12) with a first time appearance for an identified Internet Protocol address value for a currently received information packet occurring in correspondence to the identified return-path domain value for the currently received information packet. In contrast, the maximum predetermined numerical value or score is two (2) with respect to the third weighted value or score in adding the fourth and fifth data structure sub-totals. A first time appearance occurrence with the identified return-path domain value corresponding to the identified from domain of the currently received information packet in the fourth data structure would result in the assigning of a value of two (2) to first sub-total of the fourth data structure for the third weighted value. Similarly, a first time appearance occurrence with the return-path domain value from the currently received information packet corresponding to the identified sender domain of the currently received information packet in the fifth data structure for the third weighted value would result in the assigning of a value of two (2) to second sub-total for the fifth data structure for the third weighted value. In the instance, for example, both the fourth and fifth data structures obtain the maximum value of two (2) the first sub-total will be provided a twenty five percent weighting of a value of two (2) and the second sub-total will be provided a seventy five percent weighting of a value of two (2). This would result in a third weighted value total of two (2).

In furtherance of step 160, the first, second and third weighted numerical values are normalized based on the sample size the total count within the related data structures. In the first weighted numerical value, if the total count in the third data structure is less than eleven (11) the first weighted numerical value will be multiplied by (0.40 times total count/10. If the total count within the third data structure is greater than eleven (11), then the first weighted value will be multiplied by 1−1/square root (total count/10).

This normalization is also carried out for the second weighted numerical value based on a sample size of the total count within the first and second data structures. The first sub-total is normalized with the sample size of the total count within the first data structure. If the total count in the first data structure is less than eleven (11) the first sub-total of the second weighted numerical value will be multiplied by 1−1 (1/square root of (11/10). If the total count within the first data structure is greater than eleven (11), then the first sub-total based of the second weighted value will be multiplied by 1−1/square root (total count/10). The second sub-total of the second weighted numerical value is normalized with the sample size of the total count within the second data structure. If the total count in the second data structure is less than eleven (11) the second sub-total of the second weighted numerical value will be multiplied by 1−1 (1/square root of (11/10). If the total count within the second data structure is greater than eleven (11), then the second sub-total based of the second weighted value will be multiplied by 1−1/square root (total count/10).

With respect to the third weighted numerical value, the third weighted numerical value is normalized based on a sample size of the total count within the fourth and fifth data structures. The first sub-total is normalized with the sample size of the total count within the fourth data structure. If the total count in the fourth second data structure is less than eleven (11) the first sub-total of the third weighted numerical value will be multiplied by 1−1 (1/square root of (11/10). If the total count within the fourth data structure is greater than eleven (11), then the first sub-total based of the third weighted value will be multiplied by 1−1/square root (total count/10). The second sub-total of the third weighted numerical value is normalized with the sample size of the total count within the fifth data structure. If the total count in the fifth data structure is less than eleven (11) the second sub-total of the third weighted numerical value will be multiplied by 1−1 (1/square root of (11/10). If the total count within the fifth data structure is greater than eleven (11), then the second sub-total based of the third weighted value will be multiplied by 1−1/square root (total count/10).

In carrying out step 160, the method for generating a spoofed score for the currently received information packet further includes the step of obtaining the step of summing the values of the first weighted numerical value, plus; the second weighted numerical value, plus the third weighted numerical value. In summing these values, in this example, the first weighted numerical value will span from having a value of zero (0) through having a value up to a maximum value of twelve (12). The second weighted numerical value will span from having a value of zero (0) through having a value up to a maximum value of six (6). The third weighted numerical value of this example will span from having a value of zero (0) through having a value up to a maximum value of two (2). Thus summing these values, in this example, will result in a value or score of zero (0) to a maximum value of twenty (20). The summed value further includes the step of multiplying the summed value or score of the first weighted numerical value, plus the second weighted numerical value plus the third weighted numerical value by a fixed value such that with a maximum for each of the first, second and third weighted numerical values would result in the total having a value of 100. In this example, the fixed value would be five (5), which when multiplied to the maximum value of twenty (20), of the summed values, provides the highest potential spoof score of 100.

With the summed score multiplied by the fixed value of five (5) in this example, the recipient of the generated spoof score of a recently received e-mail, with a lower score in this zero (0) to one hundred (100) range, will generate, as for step 162, an indication of the recently received e-mail of not likely being spoofed. In contrast, as the score is higher, in this zero (0) to one hundred (100) range, this would indicate a higher probability the recently received e-mail is spoofed. In this scoring range example, an indication of spoof probability for the recently received e-mail can be set such that zero (0) would indicate no spoofing present; ten (10) would indicate very low spoofing probability; fifty (50) would indicate the likelihood of the presence or absence of spoofing was equally rated; and scores of above fifty (50) would indicate a greater likelihood of the presence of spoofing. In this embodiment, further maintenance is carried out on the historical data which is being updated within database device 114 with the extracted values from the metadata of the received e-mails in step 148. The database is maintaining the score count, the highest count and the total count for each currently received information packet for the first, second, third, fourth and fifth data structures. This data is maintained in relationship to a date the score count, highest count and total count were obtained within the database.

The maintenance further includes setting a first designated time period interval having a beginning date and an ending date and positioning the score count, highest count and the total count which were obtained in the first designated time interval between the beginning and the ending dates, within the first designated time period interval.

The maintenance further includes multiplying, at a time within a current designated time interval and after the expiration of the first designated time period interval, each of the score, highest and total counts within the first designated time period interval that has just expired and within each of a preceding designated time period interval, equal in time duration of the just expired first designated time period interval, by $1/(2^N)$, wherein N is an exponent corresponding to the number of designated time period intervals removed from the current designated time period interval. This time interval in this example, is one month. Thus, as each month expires, the score counts, highest counts and the total counts of each data structure is adjusted. The counts within the month previous to the current month is multiplied by ½, the month previous to that month is multiplied by ¼ and the month previous this last identified will be multiplied by ⅛ and so on. Thus, as time goes on, the more distant in time counts are from the current time period interval, the less importance will be placed on those count values.

Another maintenance step that is taken with respect to the historical data being updated in step 148, includes purging an Internet Protocol address value from the first, second and third data structures should the Internet Protocol address value not have appeared for a second designated time period interval. Should the purging of the Internet Protocol address occur, a subsequent appearance of the Internet Protocol address value would be designated as a first appearance.

In addition, purging a return-path domain value from the fourth and fifth data structures should the return-path value not have appeared for the second designated time period interval, a subsequent appearance of the return-path domain value would be designated as a first appearance. In the present example, the second designated time period interval is a period of one month.

While various embodiments have been described above, this disclosure is not intended to be limited thereto. Variations can be made to the disclosed embodiments that are still within the scope of the appended claims.

What is claimed:

1. A computer implemented method comprising a hardware processor for detecting a spoofed information packet, the method comprising the steps of:
    building a database from data values from predetermined designated fields of metadata from a previously received information packet and a currently received information packet, further including the steps of:
    locating the predetermined designated fields within the metadata of the previously received information packet;
    extracting a value from each of the predetermined designated fields within the metadata of the previously received information packet;
    updating the database with each value extracted from the metadata of the previously received information packet and storing each extracted value into at least one data structure of a group of data structures within the database;
    locating the predetermined designated fields within the metadata of the currently received information packet;
    extracting a value from each of the predetermined designated fields of metadata of the currently received information packet;
    updating the database with each value extracted from the currently received information packet and storing each extracted value from each of the predetermined designated fields of the currently received information packet into at least one of a data structure of the group of data structures within the database, such that each value extracted from the predetermined designated fields of the currently received information packet will be stored within a data structure of the group of data structures, which comprises a designation of the predetermined designated field from which the value was extracted;
    the step of building the database further includes the predetermined designated fields comprise a from domain value, a sender domain value, a return-path domain value, an Internet Protocol address value, or combinations thereof;
    wherein the group of data structures, comprise:
    a first data structure comprising a from domain predetermined designated field designation value corresponding to an Internet Protocol address predetermined designated field designation value;
    a second data structure comprising a sender domain predetermined designated field designation value corresponding to the Internet Protocol address predetermined designated field designation value;
    a third data structure comprising a return-path domain predetermined designated field designation value corresponding to the Internet Protocol address predetermined designated field designation value;
    a fourth data structure comprising the from domain predetermined designated field designation value corresponding to the return-path domain predetermined designated field designation value;
    a fifth data structure comprising the sender domain predetermined designated field designation value corresponding to the return-path domain predetermined designated field designation value and
    generating, by the hardware processor, a spoofed score for the currently received information packet.

2. The method for detecting a spoofed information packet of claim 1 wherein:
    the previously received information packet comprises previously received e-mail; and
    the currently received information packet comprises currently received e-mail.

3. The method for detecting a spoofed information packet of claim 1, wherein the Internet Protocol address value is a last hop server address value, wherein the last hop server address value is transmitted to a receiving spoof detection server.

4. The method for detecting a spoofed information packet of claim 1, wherein the step of updating the database with extracted values from each extracted value from each of the predetermined designated fields the metadata of the previously received information packet or e-mail, further comprises:
    the step of storing a from domain value, a sender domain value and a return-path domain value, extracted from the previously received information packet, such that the from domain value is stored in the from domain predetermined designated field designation value of first data structure, the sender domain value is stored in the sender domain predetermined designated field designation value of the second data structure, and the return-path domain value is stored within the return-path domain value predetermined designated field designation value of the third data structure respectively, and an extracted value of an Internet Protocol address value, extracted from the previously received information packet, is stored in each of the first, second and third data structures in the Internet Protocol address predetermined designated field designation value respectively, in correspondence with each of the stored from domain, sender domain and return-path domain values; and
    storing the from domain value in the fourth data structure in the from domain predetermined designated field designation value and the sender domain value in the fifth data structure in the sender domain predetermined designated field designation value, and storing the return-path domain value in the fourth and fifth data structures in the return-path domain predetermined designated field designation values of the fourth and fifth data structures, corresponding to the stored from and sender domain values, respectively.

5. The method for detecting a spoofed information packet of claim 1, wherein the step of updating the database with extracted values from each extracted value from each of the predetermined designated fields the metadata of the currently received information packet or e-mail comprises the steps of:
    storing a from domain value, a sender domain value and a return-path domain value in the from domain extracted from the currently received information packet, such that the from domain value is store in the from domain predetermined designated field designation value of first data structure, in the sender domain predetermined designated field designation value, and in the return-path domain predetermined designated field designation value of the third data structure, respectively, and an extracted value of an Internet Protocol address value is stored in each of the first, second and third data structures in the Internet Protocol address predetermined designated field designation value in correspondence with each of the stored from domain, sender domain and return-path domain values, respectively; and storing the from domain value in the fourth data structure in the from domain predetermined designated field designation value and the sender domain value in the fifth data structure in the sender domain predetermined designated field designation value, and the return-path domain value in the fourth and fifth data structures in the return-path domain predetermined designated field value of the fourth and fifth data structures corresponding to the stored from and sender domain values.

6. The method for detecting a spoofed information packet of claim 5, further including the steps of:

maintaining a score count comprising a count number of occurrence of the appearing of a same Internet Protocol address value which corresponds to a from domain value within the first data structure;

maintaining a score count comprising a count number of occurrence of the appearing of a same Internet Protocol address value which corresponds to a sender domain value within the second data structure;

maintaining a score count comprising a count number of occurrence of the appearing of a same Internet Protocol address value which corresponds to a return-path domain value within the third data structure;

maintaining a score count comprising a count number of occurrence of the appearing of a same return-path domain value which corresponds to a from domain value within the fourth data structure; and maintaining a score count comprising a count number of occurrence of the appearing of a same return-path domain value which corresponds to a sender domain value within the fifth data structure.

7. The method for detecting a spoofed information packet of claim 6, further including the steps of:

maintaining a highest count comprising a highest count number of occurrence of the appearing of the same Internet Protocol address value which corresponds to a from domain value within the first data structure;

maintaining a highest count comprising a highest count number of occurrence of the appearing of the same Internet Protocol address value which corresponds to a sender domain value within the second data structure;

maintaining a highest count comprising a highest count number of occurrence of the appearing of the same Internet Protocol address value which corresponds to a return-path domain value within the third data structure;

maintaining a highest count comprising a highest count number of occurrence of the appearing of the same return-path domain value which corresponds to a from domain value within the fourth data structure; and maintaining a highest count comprising a highest count number of occurrence of the appearing of the same return-path value which corresponds to the same sender path domain value within the fifth data structure.

8. The method for detecting a spoofed information packet of claim 7, further including the steps of:

maintaining a total count comprising a total number of occurrence of the appearing of all of the Internet Protocol address values which correspond to a from domain value within the first data structure;

maintaining a total count comprising a total number of occurrence of the appearing of all of the Internet Protocol address values which correspond to a sender domain value within the second data structure;

maintaining a total count comprising a total count of occurrence of the appearing of all of the Internet Protocol address values which correspond to a return-path domain value within the third data structure;

maintaining a total count comprising a total count of occurrence of the appearing of all of the return-path domain values which correspond to a from domain value within the fourth data structure; and maintaining a total count comprising a total count of occurrence of the appearing of all of the return-path domain values which correspond to a sender path domain value within the fifth data structure.

9. The method for detecting a spoofed information packet of claim 8, the step of generating a spoofed score for the currently received information packet further includes the step for calculating a threshold value for each of the first, second, third, fourth and fifth data structures for the currently received information packet.

10. The method for detecting a spoofed information packet of claim 9, wherein the step for calculating the threshold value for each of the first, second, third, fourth and fifth data structures for the currently received information packet, comprises the steps of:

calculating the threshold value for the first data structure includes applying the highest and total counts from the first data structure for the currently received information packet such that the threshold value comprises the highest count times (the highest count/the total count) times 0.05;

calculating the threshold value for the second data structure includes applying the highest and total counts from the second data structure for the currently received information packet such that the threshold value comprises the highest count times (the highest count/the total count) times 0.05;

calculating the threshold value for the third data structure includes applying the highest and total counts from the third data structure for the currently received information packet such that the threshold value comprises the highest count times (the highest count/the total count) times 0.05;

calculating the threshold value for the fourth data structure includes applying the highest and total counts from the fourth data structure for the currently received information packet such that the threshold value comprises the highest count times (the highest count/the total count) times 0.01; and calculating the threshold value for the fifth data structure includes applying the highest and total counts from the fifth data structure for the currently received information packet such that the threshold value comprises the highest count times (the highest count/the total count) times 0.01.

11. The method for detecting a spoofed information packet of claim 10, wherein the step of generating a spoofed score for the currently received information packet further includes the steps of:

assigning a predetermined numerical value to the first data structure, having a value which indicates the currently received information packet is scoring in a direction indicating the currently received information packet is spoofed, with the Internet Protocol address value of the currently received information packet being received for the first time corresponding to the from domain value, of the currently received information packet, within the first data structure;

assigning a predetermined numerical value to the second data structure, having a value which indicates the currently received information packet is scoring in the direction indicating the currently received information packet is spoofed, with the Internet Protocol address value, of the currently received information packet, being received for the first time corresponding to the sender domain value, of the currently received information packet, value within the second data structure;

assigning a predetermined numerical value to the third data structure, having a value which indicates the currently received information packet is scoring in the direction indicating the currently received information packet is spoofed, with the Internet Protocol address value, of the currently received information packet, being received for the first time corresponding to the return-path domain value, of the currently received information packet, within the third data structure;

assigning a predetermined numerical value to the fourth data structure, having a value which indicates the currently received information packet is scoring in the direction indicating the currently received information packet is spoofed, with the return-domain value, of the currently received information packet, being received for the first time corresponding to the from domain value, of the currently received information packet, within the fourth data structure; and assigning a predetermined numerical value to the fifth data structure, having a value which indicates the currently received information packet is scoring in the direction indicating the currently received information packet is spoofed, with the return-path value, of the currently received information packet, being received for the first time corresponding to the sender domain value, of the currently received information packet, within the fifth data structure.

12. The method for detecting a spoofed information packet of claim 11, wherein the step of generating a spoofed score for the currently received information packet further includes the steps of:

assigning another predetermined numerical value to the first data structure, having a numerical value, which indicates the currently received information packet is scoring in a direction away from indicating the currently received information packet is spoofed, with the Internet Protocol address, of the currently received information packet, having a score count greater than the threshold value for the first data structure;

assigning another predetermined numerical value to the second data structure, having a numerical value, which indicates the currently received information packet is scoring in a direction away from indicating the currently received information packet is spoofed, with the Internet Protocol address value, of the currently received information packet, having a score count greater than the threshold value for the second data structure;

assigning another predetermined numerical value to the third data structure, having a numerical value, which indicates the currently received information packet is scoring in a direction away from indicating the currently received information packet is spoofed, with the Internet Protocol address value, of the currently received information packet, having a score count greater than the threshold value for the third data structure;

assigning another predetermined numerical value to the fourth data structure, having a numerical value that indicates the currently received information packet is scoring in a direction away from indicating the currently received information packet is spoofed, with the return-path domain value, of the currently received information packet, having a score count greater than the threshold value for the fourth data structure; and assigning another predetermined numerical value to the fifth data structure, having a numerical value that indicates the currently received information packet is scoring in a direction away from indicating the currently received information packet is spoofed, with the return-path domain value, of the currently received information packet, having a score count greater than the threshold value for the fifth data structure.

13. The method for detecting a spoofed information packet of claim 12, wherein the step for generating a spoofed score for the currently received information packet further includes the steps of:

deriving a first weighted numerical value based on the third data structure, wherein establishing the first weighted numerical value with assigning one of the predetermined numerical value of the third data structure or the other predetermined numerical value of the third data structure, to the first weighted numerical value, or calculating the first weighted numerical value with the application of the score count for the Internet Protocol address value of the third data structure and the threshold value of the third data structure, obtained from the currently received information packet;

deriving a second weighted numerical value from a summation of a first sub-total value based on the first data structure and a second sub-total value based on the second data structure, comprising:

deriving the first sub-total value with assigning one of the predetermined numerical value of the first data structure or the other predetermined numerical value of the first data structure to the first sub-total value, or calculating the first sub-total value with the application of the score count for the Internet Protocol address value of the first data structure and the threshold value of the first data structure, obtained from the currently received information packet; and deriving the second sub-total value with assigning one of the predetermined numerical value of the second data structure or the other predetermined numerical value of the second data structure to the first weighted numerical value, or calculating the first weighted numerical value with the application of the score count for the Internet Protocol address value of the second data structure and the threshold value of the second data structure, obtained from the currently received information packet, wherein, with both values for the from domain and the sender domain present within the predetermined designated fields for the currently received information packet, the first sub-total value of the second weighted numerical value and the second sub-total value of the second weighted numerical value are weighted, such that the first sub-total value is multiplied by twenty-five percent and the second sub-total is multiplied by seventy-five percent before summing the first and second sub-totals together to obtain the second weighted numerical value, otherwise, should a value for the sender domain not be present in the predetermined designated fields of the currently received information packet, the first sub-total becomes the second weighted numerical value;

deriving a third weighted numerical value from a summation of a first sub-total value based on the fourth data structure and a second sub-total value based on the fifth data structure, comprising:

deriving the first sub-total value with assigning one of the predetermined numerical value of the fourth data structure or the other predetermined numerical value of the fourth data structure to the first sub-total value, or calculating the first sub-total value with the application of the score count for the Internet Protocol address value of the fourth data structure and the threshold value of the fourth data structure, obtained from the currently received information packet; and deriving the second sub-total value with assigning one of the predetermined numerical value of the fifth data structure or the other predetermined numerical value of the fifth data structure to the first weighted numerical value, or calculating the third weighted numerical value with the application of the score count for the Internet Protocol address value of the fifth data structure and the threshold value of the fifth data structure, obtained from the currently received information packet, wherein, with both values for the from domain and the sender domain present within the predetermined designated fields for the currently received information packet, the first sub-total value of the third weighted numerical value and the second sub-total value of the third weighted numerical value are weighted, such that the first sub-total value is multiplied by twenty-five percent and the second sub-total is multiplied by seventy-five percent before summing the first and second sub-totals together to obtain the third weighted numerical value, otherwise, should a value for the sender domain not be present in the predetermined designated fields of the currently received information packet, the first sub-total becomes the third weighted numerical value.

14. The method for detecting a spoofed information packet of claim 13, wherein the step for generating a spoofed score for the currently received information packet further includes:

the first weighted numerical value has a two times greater importance than the second weighted numerical value;

the first weighted numerical value has a six times greater importance than the third weighted numerical value; and, wherein:

the first weighted numerical value is normalized based on a sample size of the total count within the third data structure;

the second weighted numerical value is normalized based on a sample size of the total count within the first and second data structures, wherein:

the first sub-total is normalized with the sample size of the total count within the first data structure; and the second sub-total is normalized with the sample size of the total count within the second data structure; and the third weighted numerical value is normalized based on a sample size of the total count within the fourth and fifth data structures, wherein:

the first sub-total is normalized with the sample size of the total count within the fourth data structure; and the second sub-total is normalized with the sample size of the total count within the fifth data structure.

15. The method for detecting a spoofed information packet of claim 14, wherein the step for generating a spoofed score for the currently received information packet further includes the step of obtaining a total spoofed score includes the step of summing the following:

the first weighted numerical value, plus;

the second weighted numerical value, plus; and the third weighted numerical value.

16. The method for detecting a spoofed information packet of claim 15, wherein the step for generating a spoofed score for the currently received information packet further includes the step of multiplying, the summing of the first weighted numerical value, plus the second weighted numerical value plus the third weighted numerical value, by a fixed value such that with a maximum values for each of the first, second and third weighted numerical values the total would result in a value of 100.

17. The method for detecting a spoofed information packet of claim 8, wherein the step of updating database with extracted values includes the step of:

maintaining the score count, the highest count and the total count for each currently received information packet of the first, second, third, fourth and fifth data structures, in relationship to a date in which the score count, highest count and total count were obtained;

setting a first designated time period interval having a beginning date and an ending date, and positioning, the score count, highest count and total count, which were obtained in the first designated time period interval between the beginning and the ending dates, within the first designated time period interval; and multiplying, at a time within a current designated time period interval and after the expiration of the first designated time period interval, each of the score, highest and total counts, within the first designated time period interval, which has just expired, and within each of a preceding designated time period interval within which score, highest and total counts are positioned, equal in time duration of the just expired first designated time period interval, by $1/(2^{\wedge}N)$, wherein N is an exponent corresponding to the number of designated time period intervals removed from the current designated time period interval.

18. The method for detecting a spoofed information packet of claim 5, wherein the step of updating database with extracted values includes the step of:

purging an Internet Protocol address value from the first, second and third data structures should the Internet Protocol address value not have appeared in a currently received information packet for a second designated time period interval, a subsequent appearance of the Internet Protocol address value, after purging, would be designated as a first appearance; and purging a return-path domain value from the fourth and fifth data structures should the return-path value not have appeared in a currently received information packet for one month, a subsequent appearance of the return-path domain value, after purging, would be designated as a first appearance.

19. The method for detecting a spoofed information packet of claim 1, wherein:

each data structure comprises a relationship between two different designated predetermined fields which correspond to two different designated predetermined fields within the metadata; and the predetermined designated fields of the metadata are fully represented within the group of the data structures, such that each value extracted from the predetermined designated fields of the previously received information packet will be stored within a data structure, which comprises a designation of the predetermined designated field from which the value was extracted.

* * * * *